United States Patent
Suzuki et al.

(10) Patent No.: US 8,511,775 B2
(45) Date of Patent: Aug. 20, 2013

(54) PRINT HEAD, PRINTING DEVICE, AND PRINTING METHOD

(75) Inventors: Masato Suzuki, Nagano (JP); Naoki Sudo, Nagano (JP); Bunji Ishimoto, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 30 days.

(21) Appl. No.: 13/295,401

(22) Filed: Nov. 14, 2011

(65) Prior Publication Data

US 2012/0120135 A1 May 17, 2012

(30) Foreign Application Priority Data

Nov. 16, 2010 (JP) ................................. 2010-255463

(51) Int. Cl.
*B41J 29/38* (2006.01)

(52) U.S. Cl.
USPC .......................................................... 347/12

(58) Field of Classification Search
CPC .............................. B41J 2/2114; B41J 11/009
USPC ...................................... 347/9–12, 14, 15, 40
See application file for complete search history.

(56) References Cited

U.S. PATENT DOCUMENTS

| 6,585,354 | B2 * | 7/2003 | Otani | 347/43 |
| 6,669,319 | B2 * | 12/2003 | Shimizu | 347/15 |
| 7,422,300 | B2 * | 9/2008 | Yamanobe | 347/14 |
| 2005/0200641 | A1 | 9/2005 | Tanaka et al. | |
| 2009/0284559 | A1 | 11/2009 | Sudo et al. | |

FOREIGN PATENT DOCUMENTS

| JP | 2001-080065 A | 3/2001 |
| JP | 2002-113852 A | 4/2002 |
| JP | 2005-081642 A | 3/2005 |
| JP | 2005-271575 A | 10/2005 |
| JP | 2009-113412 A | 5/2009 |
| JP | 2009-274280 A | 11/2009 |

* cited by examiner

*Primary Examiner* — An Do
(74) *Attorney, Agent, or Firm* — Global IP Counselors, LLP

(57) ABSTRACT

To provide a technique for largely preventing conspicuous banding from appearing in printed images, a print head is provided with three nozzle rows in which a plurality of nozzles are arrayed in a sub-scanning direction, the nozzle rows being spaced apart in a main scanning direction. In two nozzle rows among the three nozzle rows, the positions of the nozzles in the sub-scanning direction are mutually the same, and in one nozzle row among the three nozzle rows, the positions of the nozzles the sub-scanning direction lie between nozzles of the two nozzle rows in the sub-scanning direction. The three nozzle rows can eject ink of the same hue.

17 Claims, 11 Drawing Sheets

PRINTED IMAGE BY MASK TO REPLACE C, D IN EVERY RASTER LINE

PRINTED IMAGE WHEN M2 WAS APPLIED

PRINT HEAD INSTALLED INCLINED

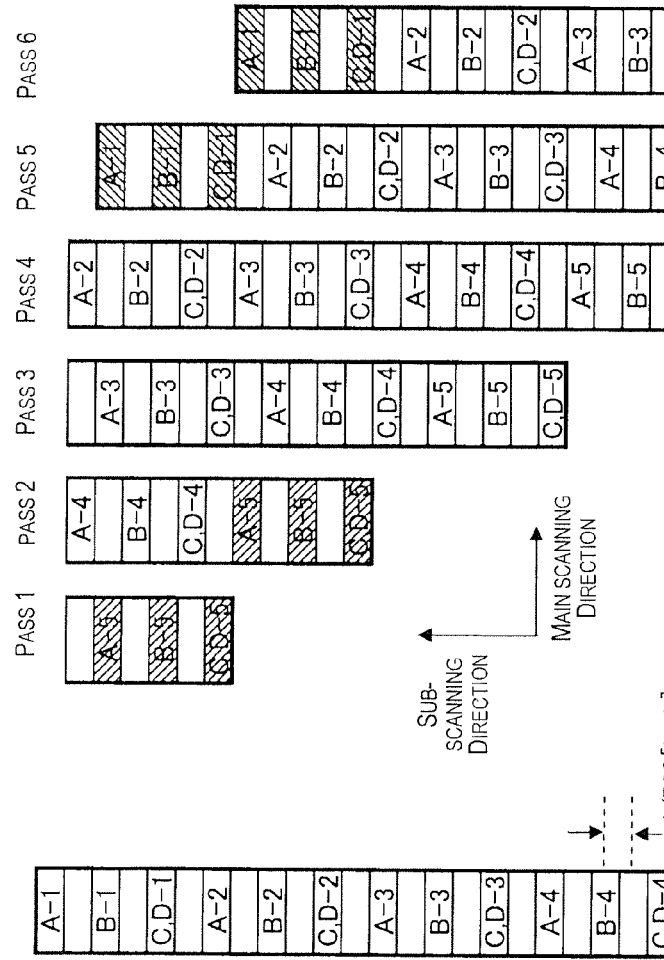

PRINT HEAD, PRINTING DEVICE, AND PRINTING METHOD

CROSS-REFERENCE TO RELATED APPLICATIONS

This application claims priority to Japanese Patent Application No. 2010-255463 filed on Nov. 16, 2010. The entire disclosure of Japanese Patent Application No. 2010-255463 is hereby incorporated herein by reference.

BACKGROUND

1. Technological Field

The present invention relates to a printing device.

2. Background Technology

The printing technique of for example, Patent Citation 1 is one known technique for carrying out printing at high resolution. According to the aforedescribed technique, a plurality of nozzle rows provided to a print head are shifted relative to one another by a predetermined spacing in the sub-scanning direction.

However, a problem has been pointed out in that, due to inclination of the print head, errors in the scanning amount in the sub-scanning direction relative to the printing medium, ink landing error from individual nozzles, or the like, ink landing positions may deviate from their target positions, and localized density of dot disposition (herein also termed "banding") may be conspicuous in the printed image.

Japanese Patent Application Publication No. 2002-113852 (Patent Citation 1) is an example of the related art.

SUMMARY

Problems to be Solved by the Invention

The invention was contrived to resolve the problems in the past discussed above, it being an advantage thereof to provide a technique for largely preventing conspicuous banding from appearing in printed images when high-resolution printing is performed.

Means Used to Solve the Above-Mentioned Problems

In order to address at least some of these problems, it is possible for the aspects and embodiments described below to be adopted in the invention.

First Aspect

A printing device including: a print head provided with a plurality of nozzles for ejecting ink of the same hue; a head-moving section for causing the print head to move relative to a printing medium in a main scanning direction and in an intersecting sub-scanning direction; and a controller for controlling the scanning of the print head performed by the head-moving section and ejection of ink from the nozzles; wherein the print head is provided with three or more nozzle rows in which a plurality of nozzles for ejecting ink of the same hue are arrayed in the sub-scanning direction, the nozzle rows being spaced apart in the main scanning direction; two or more nozzle rows among the plurality of nozzle rows are disposed as co-positioned nozzle rows in which the positions of the arrayed nozzles in the sub-scanning direction are mutually the same; one or more nozzle rows among the plurality of nozzle rows are disposed as nozzle rows in which the arrayed nozzles are positioned between nozzles of the co-positioned nozzle rows in the sub-scanning direction; and the controller carries out the control such that at least some raster lines which form a printed image include ink dots formed by ink ejected from two or more nozzles of mutually the same position in the sub-scanning direction and respectively belonging to the co-positioned nozzle rows.

According to this printing device, the controller carries out control such that at least some of the raster lines which form a printed image include ink dots formed by ink ejected from two or more nozzles of mutually the same position in the sub-scanning direction and respectively belonging to the co-positioned nozzle rows, and therefore the appearance of conspicuous banding in the printed image can be largely avoided.

Second Aspect

The printing device according to the first aspect, wherein ink dots included in at least some of the raster lines which form the printed image, which ink dots are formed by ink ejected from two or more nozzles of mutually the same position in the sub-scanning direction and respectively belonging to the co-positioned nozzle rows, are ink dots formed during the main scanning of the print head one time.

According to this printing device, the appearance of conspicuous banding in the printed image is largely avoided, and a single raster line in a printed image can be formed in a main scanning of the print head one time.

Third Aspect

The printing device according to the first or second aspect, wherein the controller further carries out the control such that at least some of the raster lines which form the printed image include ink dots formed by ink ejected from two or more nozzles of different positions in the sub-scanning direction and belonging to the co-positioned nozzle rows.

According to this printing device, banding caused by scanning of the print head (or paper feed) in the sub-scanning direction relative to the printing medium can be minimized.

Fourth Aspect

The printing device according to any of the first to third aspects, wherein the controller further carries out the control such that, among all of the ink dots forming a predetermined printed image, a total dot count of ink dots formed by nozzles of two or more nozzle rows belonging to the co-positioned nozzle rows is approximately uniform in every one of the nozzle rows.

According to this printing device, the amount of ink consumed by each of the two or more nozzle rows belonging to the co-positioned nozzle rows is approximately uniform during printing one time.

Fifth Aspect

The printing device according to any of the first to fourth aspects, wherein the controller further carries out the control such that, a total dot count of ink dots included in at least some of the raster lines which form the printed image, which ink dots are formed by ink ejected from two or more nozzles of mutually the same position in the sub-scanning direction and belonging to the co-positioned nozzle rows, is approximately uniform in every one of the nozzle rows.

According to this printing device, at least some of the raster lines which form the printed image include ink dots formed by ink ejected from two or more nozzles of mutually different positions in the sub-scanning direction and belonging to the co-positioned nozzle rows, and moreover the number of ink dots based on these nozzles is approximately uniform, and therefore the appearance of conspicuous banding in the printed image can be further avoided.

Sixth Aspect

The printing device according to any of the first to fifth aspects, wherein the controller further carries out the control such that, among ink dots forming a predetermined printed image, for ink dots formed by nozzles of two or more nozzle rows belonging to the co-positioned nozzle rows, every ink dot based on the nozzle rows is dispersed approximately evenly throughout the entirety of the printed image.

According to this printing device, banding appearing in a printed image can be dispersed, and made even less conspicuous.

Seventh Aspect

A print head including a plurality of nozzles for ejecting ink of the same hue, and adapted for use in the printing device according to any of the first to sixth aspects, wherein the print head includes three or more nozzle rows in which the plurality of nozzles are arrayed in a sub-scanning direction, the nozzle rows being spaced apart in a main scanning direction; two or more nozzle rows among the plurality of nozzle rows are disposed as co-positioned nozzle rows in which the positions of the arrayed nozzles in the sub-scanning direction are mutually the same; and one or more nozzle rows among the plurality of nozzle rows are disposed as nozzle rows in which the arrayed nozzles are positioned between nozzles of the co-positioned nozzle rows in the sub-scanning direction.

This print head can be used in a printing device for carrying out printing under control carried out such that at least some of the raster lines which form the printed image include ink dots formed by ink ejected from two or more nozzles of mutually the same position in the sub-scanning direction and respectively belonging to the co-positioned nozzle rows; and in cases where the print head in question is used in such a printing device, the tendency for conspicuous banding to appear in the printed image can be minimized.

Eighth Aspect

A print head including three nozzle rows in which a plurality of nozzles are arrayed in a sub-scanning direction, the nozzle rows being spaced apart in a main scanning direction; wherein in two nozzle rows among the three nozzle rows, the positions of the nozzles in the sub-scanning direction are mutually the same; in one nozzle row among the three nozzle rows, the positions of the nozzles the sub-scanning direction lie between nozzles of the two nozzle rows in the sub-scanning direction; and the three nozzle rows can eject ink of the same hue.

Ninth Aspect

The print head according to the eighth aspect, further including a separate nozzle row spaced apart in the main scanning direction, wherein the positions of the nozzles in the sub-scanning direction in the separate nozzle row lie between nozzles of the three nozzle rows in the sub-scanning direction; and the separate nozzle row can eject ink of the same hue as the three nozzle rows.

Tenth Aspect

The print head according to the ninth aspect, wherein the two nozzle rows are mutually provided to the same nozzle unit; and the one nozzle row and the separate nozzle row are mutually provided to the same nozzle unit.

Eleventh Aspect

The print head according to the ninth or tenth aspect, wherein a nozzle pitch of the three nozzle rows and a nozzle pitch of the separate nozzle row are the same.

Twelfth Aspect

A printing device including: the print head according to any of the eighth through eleventh aspects; a head-moving section for causing the print head to move relative to a printing medium in the main scanning direction and in the sub-scanning direction; and a controller for controlling the movement of the print head performed by the head-moving section and ejection of ink from the nozzles; wherein the print head is provided with three or more nozzle rows in which a plurality of nozzles for ejecting ink of the same hue are arrayed in the sub-scanning direction, the nozzle rows being spaced apart in the main scanning direction; and the controller carries out the control such that at least some raster lines which form a printed image include ink dots formed by ink ejected from two nozzles of mutually the same position in the sub-scanning direction and respectively belonging to the two nozzle rows.

Thirteenth Aspect

The printing device according to the twelfth aspect, wherein the printed image includes raster lines formed by ink ejected from two nozzles of mutually the same position in the sub-scanning direction and respectively belonging to the two nozzle rows, the raster lines being formed during the movement of the print head in the main scanning direction one time.

Fourteenth Aspect

The printing device according to the twelfth or thirteenth aspect, wherein the printed image includes raster lines formed by ink ejected from two nozzles of mutually different positions in the sub-scanning direction and respectively belonging to the two nozzle rows.

Fifteenth Aspect

The printing device according to any of the twelfth to fourteenth aspects, wherein the controller further carries out the control such that, among all of the ink dots forming the printed image, a total dot count of ink dots formed by nozzles of nozzle rows of the two nozzle rows is approximately uniform.

Sixteenth Aspect

The printing device according to any of the twelfth to fifteenth aspects, wherein the controller further carries out the control such that a total dot count of ink dots included in raster lines which form the printed image, which ink dots are formed respectively by two nozzles of mutually the same position in the sub-scanning direction and belonging to the two nozzle rows, is approximately uniform.

Seventeenth Aspect

The printing device according to any of the twelfth to sixteenth aspects, wherein the controller further carries out the control such that, among ink dots forming the printed image, ink dots formed by respective nozzles of the two nozzle rows are dispersed approximately evenly throughout the entirety of the printed image.

Eighteenth Aspect

A printing method using the print head of the first aspect, wherein the print head is caused to move relative to a printing medium, in the main scanning direction and in the sub-scanning direction; and ink of the same hue is ejected from respective nozzles of three or more nozzle rows provided to the print head.

It is possible for the invention to be realized as various embodiments. For example, the invention can be realized in embodiments such as a method and a device or printing system for minimizing banding; an integrated circuit or a computer program for realizing the functions of such a method or device; or a recording medium with the computer program recorded thereon.

BRIEF DESCRIPTION OF THE DRAWINGS

Referring now to the attached drawings which form a part of this original disclosure:

FIG. 6 is a descriptive diagram illustrating the ejection nozzle determination table M2 used in the first example;

FIG. 7 is a descriptive diagram illustrating a matrix MT;

FIG. 9 is a descriptive diagram illustrating a first modification;

DETAILED DESCRIPTION OF EXEMPLARY EMBODIMENTS

The embodiments of the invention are described next based on examples.

A. First Example (A1) Configuration of Printing Device

Figure 1:
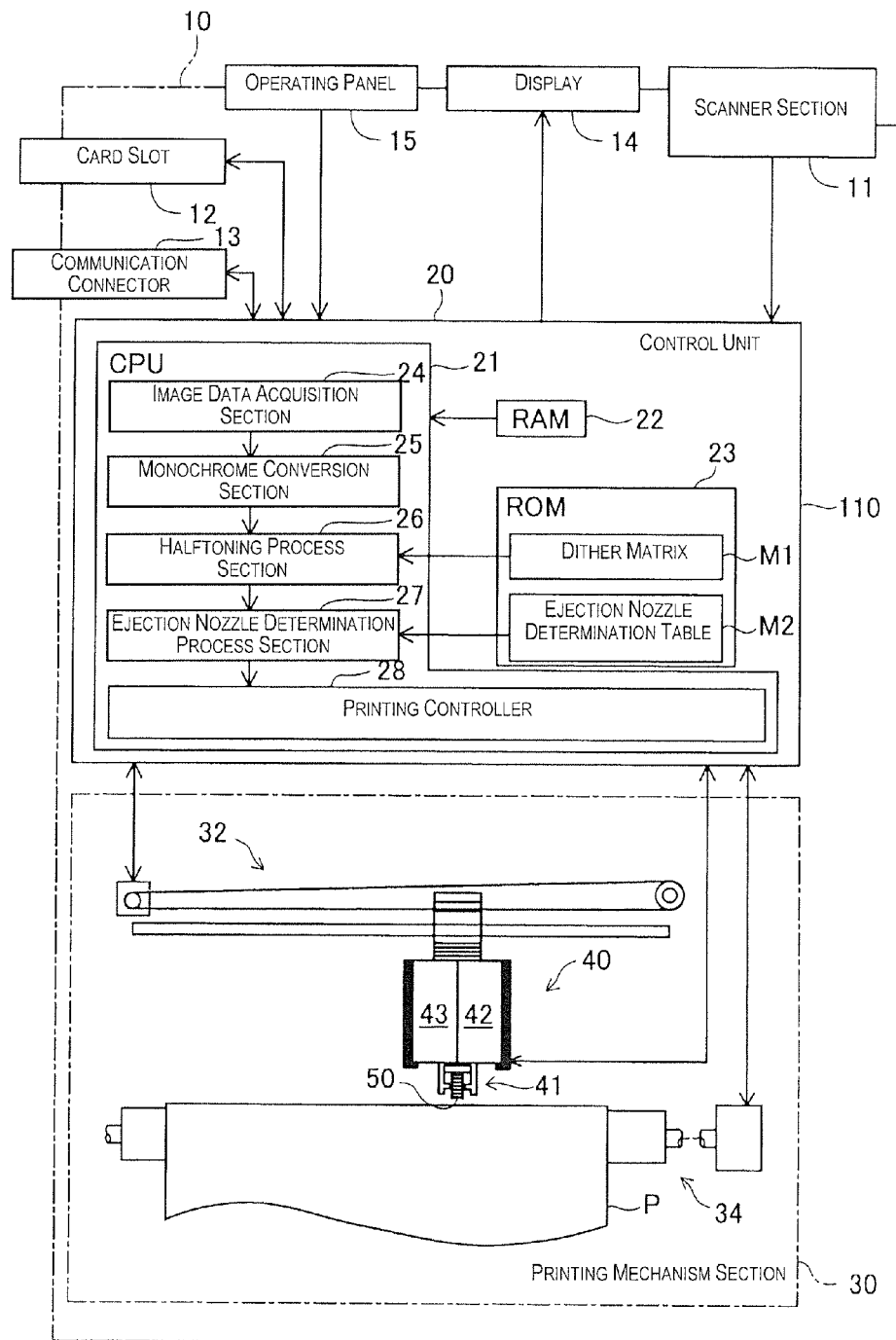
FIG. 1 is a descriptive diagram illustrating a configuration of a printing device 10 according to a first example.

FIG. 1 is a descriptive diagram illustrating a configuration of a printing device 10 according to a first example. The printing device 10 is an inkjet printer for ejecting ink onto a printing medium P on the basis of image data; and printing out text, images, and the like. In the present example, the printing device 10 is a "multifunction unit" having various functions such as scanner and copy functions. As will be discussed later, the printing device 10 is a printing device for dedicated monochrome printing, for carrying out printing using black ink only.

The printing device 10 is provided with a card slot 12 and a communication connector 13. The card slot 12 of the printing device 10 is an interface for connection to a memory card housing a storage medium, for data exchange therewith. The communication connector 13 of the printing device 10 is an interface for connection with a PC, digital camera, digital video camera, or other external equipment, for data exchange therewith. The printing device 10 has a function of printing based on a print request from external equipment connected to the communication connector 13, as well as a function of printing image data stored in a memory card connected to the card slot 12, or in external equipment connected to the communication connector 13.

The printing device 10 is further provided with a scanner section 11, a display 14, and an operating panel 15. The scanner section 11 reads in an original document which has been placed on an original-document bed, and converts it to digital data. The display 14 displays text and images to a user. The operating panel 15 receives command inputs from the user.

In addition to the above-described card slot 12 and the communication connector 13, the printing device 10 is further provided with a control unit 20 for controlling the sections of the printing device 10, and a printing mechanism section 30 for executing printing of the printing medium P.

The control unit 20 is configured from a CPU 21, a RAM 22, and a ROM 23. The CPU 21 is provided with an image data acquisition section 24, a monochrome conversion section 25, a halftoning process section 26, an ejection nozzle determination process section 27, and a printing controller 28. The image data acquisition section 24 acquires image data from the scanner section 11, the card slot 12, or the communication connector 13. In cases where the acquired image data is RGB image data, the monochrome conversion section 25 performs data conversion to monochrome image data. The halftoning process section 26 performs a process to convert image data to a distribution of dots, based on the tones of the monochrome-converted image data. A dither matrix M1 stored in the ROM 23 is used in the halftoning process. Using an ejection nozzle determination table M2 stored in the ROM 23, the ejection nozzle determination process section 27 determines, for each dot of the image data from the halftoning process, which of the nozzles provided to a print head 50 (discussed later) is to be used to eject ink to form the dot on the printing medium P. The printing controller 28 controls the operation of the printing mechanism section 30 on the basis of the processed data from the ejection nozzle determination process section 27. The above-described processes are realized through loading and execution by the CPU 21 of a program stored in the ROM 23. The dither matrix M1 and the ejection nozzle determination table M2 are stored in the ROM 23 in advance.

As shown in FIG. 1, the printing mechanism section 30 of the printing device 10 is provided with a carriage 40, a head unit 41, a carriage drive section 32, and a conveying section 34. The carriage drive section 32 drives the carriage 40 in a main scanning (head scanning) direction. The conveying section 34 conveys the printing medium P in a sub-scanning direction intersecting the main scanning direction in which the carriage 40 moves.

The carriage 40 retains the head unit 41, as well as carrying an ink cartridge 42 and an ink cartridge 43. The ink cartridges 42, 43 carried on the carriage 40 function as a liquid supply section for supplying ink to the head unit 41. Both of the ink cartridges 42, 43 contain black (BK) ink. In the present example, printing is carried out as monochrome printing with a single color of black ink; however, for example, the ink cartridges 42, 43 may contain ink of any one color, for example, sepia color, or red, blue, magenta (M), cyan (C), or the like, and printing may be carried out with a single color of magenta, cyan, or the like. Also, the two ink cartridges may contain inks of the same hue, such as where the ink cartridge 42 contains black (K), and the ink cartridge 43 contains light black (LK), or the like.

The head unit 41 is provided with a print head 50. The print head 50 is provided with a plurality of nozzles for ejecting black (BK) ink. Printing of the printing medium P is realized through cooperation among the sections of the print head 50, the carriage drive section 32, and the conveying section 34, on the basis of control by the control unit 20.

Figure 2:
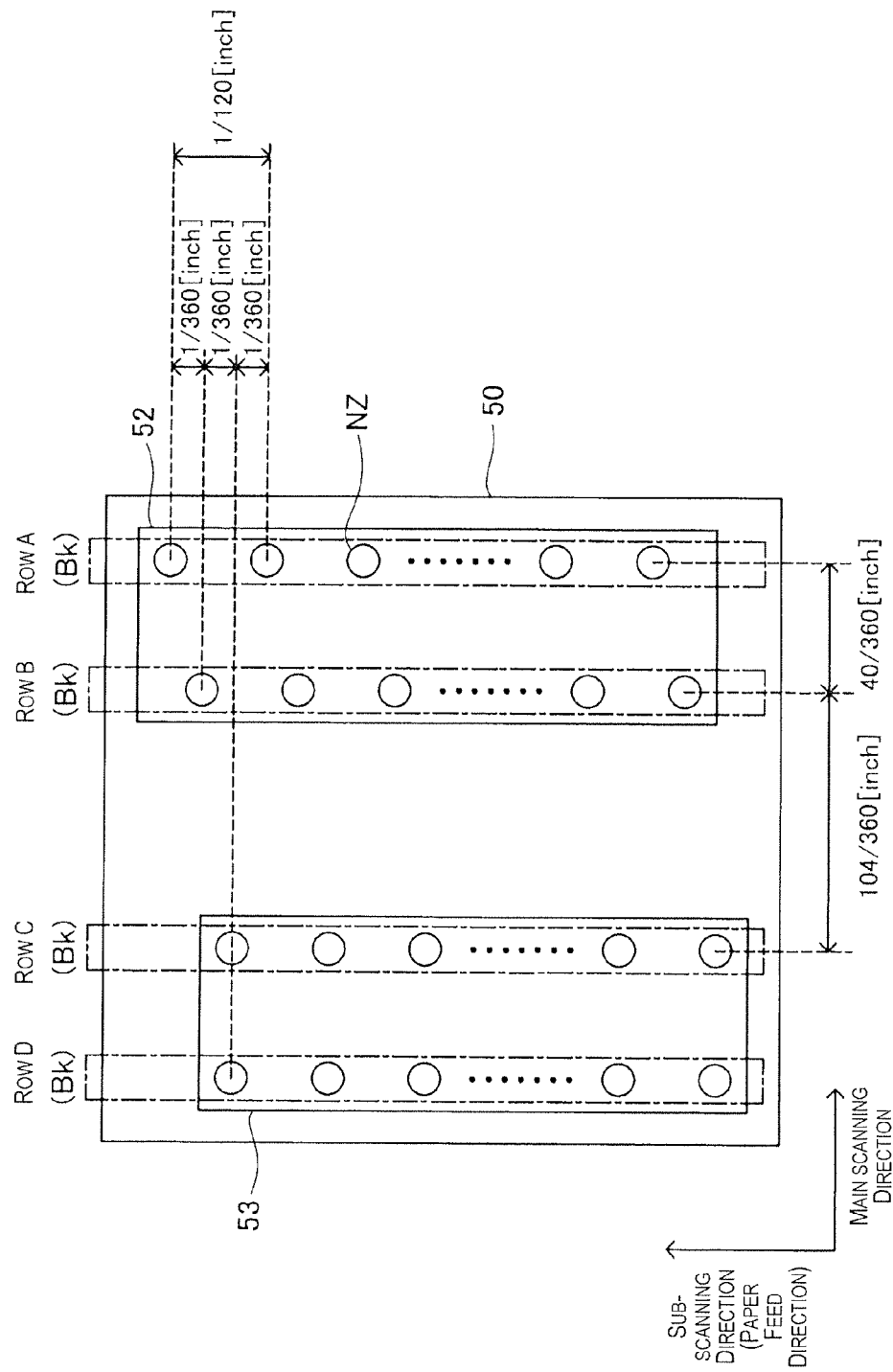
FIG. 2 is a descriptive diagram showing in model form a configuration of a print head 50 in the printing device 10.

FIG. 2 is a descriptive diagram showing in model form the configuration of the print head 50 in the printing device 10. The print head 50 is provided with a plurality of nozzle rows containing a plurality of nozzles NZ for ejecting ink (black in the present example) lined up in the sub-scanning direction (i.e., the paper feed direction).

In the present example, the print head 50 is provided with four nozzle rows, row A, row B, row C, and row D, with a plurality of nozzles NZ arrayed in the sub-scanning direction (more specifically, the paper feed direction). As shown in FIG. 2, these four nozzle rows are arranged in parallel in the main scanning direction. Row A and row B are disposed apart by a gap of $^{40}/_{360}$ (inch) in the main scanning direction. Likewise, row C and row D are disposed apart by a gap of $^{40}/_{360}$ (inch) in the main scanning direction. Row B and row C are disposed apart by a gap of $^{104}/_{360}$ (inch).

One hundred and twenty-eight of the nozzles NZ are arrayed in the sub-scanning direction in individual nozzle rows designated as row A, row B, row C, and row D. Within each nozzle row, the gap between nozzles NZ in the sub-scanning direction (hereinafter also termed "nozzle pitch") is $^{1}/_{120}$ (inch). With the nozzle row of row A as a reference point, the position of row B in the print head 50 is arranged at a position shifted by $^{1}/_{360}$ (inch) in the sub-scanning direction. With the nozzle row of row B as a reference point, the position of row C in the print head 50 is arranged at a position shifted by $^{1}/_{360}$ (inch) in the sub-scanning direction. The position of row D in the print head 50 is arranged at the same position as the nozzle row of row C in the sub-scanning direction. Consequently, by carrying out printing through scanning of the print head 50 in the main scanning direction, printing is carried out in a manner substantially similar to a print head of a configuration with a nozzle pitch of $^{1}/_{360}$ (inch). The nozzle rows of row C and row D correspond to the co-positioned nozzle rows disclosed in the Claims.

The plurality of nozzles NZ are individually provided with piezo elements (piezoelectric elements), and in association with application of a voltage to the piezo elements, ink is ejected from the nozzles NZ through oscillation induced by deformation of the piezo elements. Consequently, in addition to the piezo elements discussed above, the nozzles NZ are individually provided with electrodes for applying voltage, and with other elements necessary for ejection of ink. In the present example, during manufacture of the print head 50, a nozzle unit 52 provided with the nozzle rows of row A and row B, and a nozzle unit 53 provided with the nozzle rows of row C and row D, are manufactured individually, then the nozzle unit 52 and the nozzle unit 53 are assembled into the print head 50 main unit.

The nozzle unit 52 (or the nozzle unit 53) is manufactured using a substrate having through-holes at the positions of the nozzles NZ of row A and row B (or row C and row D). By carrying out printing of the electrodes, installation of piezo elements in the through-holes furnished to the substrate, and the like, the nozzle unit 52 (or the nozzle unit 53) is manufactured. Specifically, the nozzles NZ provided in row A and row B are manufactured in the same series of manufacturing steps. Likewise, the nozzles NZ provided in row C and row D are manufactured in the same series of manufacturing steps. In other words, row A and row B have a nozzle unit in common, and row C and row D have a nozzle unit in common.

Figure 3:
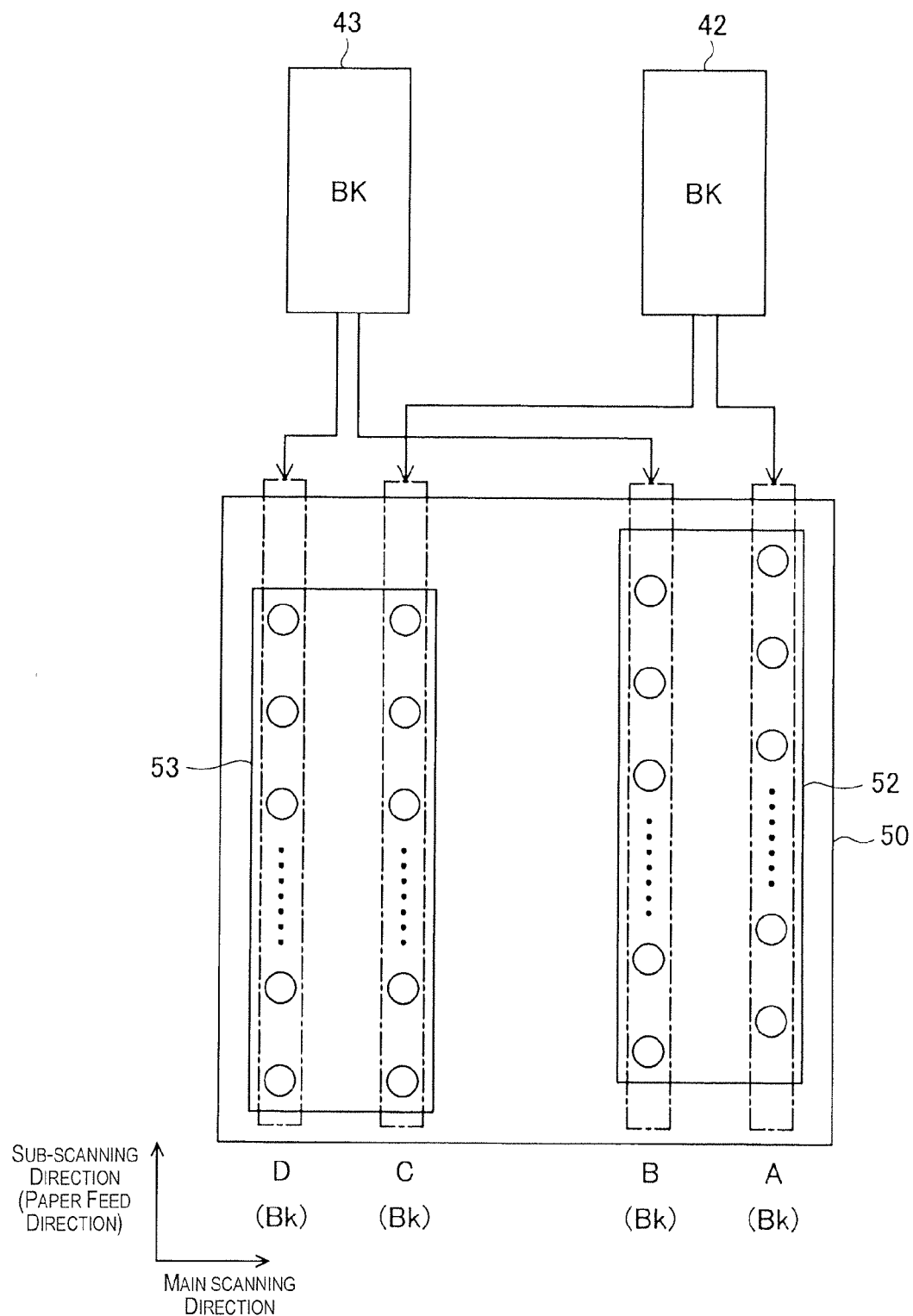
FIG. 3 is a descriptive diagram illustrating an arrangement for supplying ink.

Next, the arrangement for supplying ink from the ink cartridges 42, 43 to the nozzles NZ is described using FIG. 3. The ink cartridge 42 supplies ink to the nozzles NZ of row A and to the nozzles NZ of row C. The ink cartridge 43 supplies ink to the nozzles NZ of row B and to the nozzles NZ of row D. More specifically, each of the two nozzle units 52, 53 provided to the print head 50 is respectively supplied with ink from one cartridge. Consequently, there is no limitation to the mode of ink supply taught in the present example, and a mode in which, for example, the ink cartridge 42 supplies ink to the nozzles NZ of row B and to the nozzles NZ of row C, while the ink cartridge 43 supplies ink to the nozzles NZ of row A and the nozzles NZ of row D, is also acceptable.

(A2) Printing Process

Figure 4:
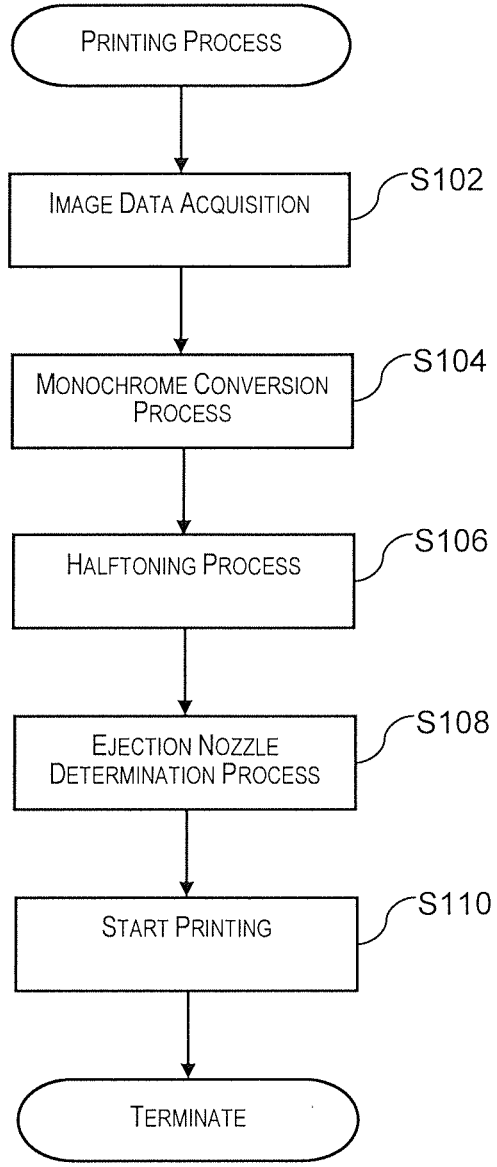
FIG. 4 is a flowchart showing the flow of a printing process carried out by the printing device 10.

Next, the printing process carried out by the printing device 10 is described. FIG. 4 is a flowchart showing the flow of the printing process carried out by the printing device 10. When the printing process starts, the CPU 21 acquires image data through the scanner section 11, the card slot 12, or the communication connector 13 (Step S102). In a case where the acquired image data is RGB image data, the image data is converted to monochrome data (Step S104). For example, conversion to monochrome image data is effected through conversion to tone values of black (K) using a three-dimensional lookup table for color conversion composed of R, G, and B elements.

After the conversion to monochrome image data, the CPU 21 carries out a halftoning process on the monochrome image data (Step S106). Specifically, using the dither matrix M1 stored in the ROM 23, the tone values of the pixels of the monochrome image data are converted to binary data. More specifically, tone data is converted to dot data by determining whether or not to form a dot on each pixel of the image data. In the present example, a known ordered dither method is used as the halftoning process. Besides an ordered dither method, an error diffusion method, a density pattern method, or another halftoning technique can be utilized as the halftoning process. Because these halftoning techniques are known techniques, description is omitted.

Subsequently, the CPU 21 carries out an ejection nozzle determination process on the image data from the halftoning process (Step S108). As discussed previously, the ejection nozzle determination process is a process for determining, for each dot of the dot data from the halftoning process, from which nozzle to eject ink to form the dot on the printing medium. While the ejection nozzle determination process is being carried out, the CPU 21 uses the ejection nozzle determination table M2 stored in the ROM 23. The ejection nozzle determination table M2 is described below.

Figure 5:
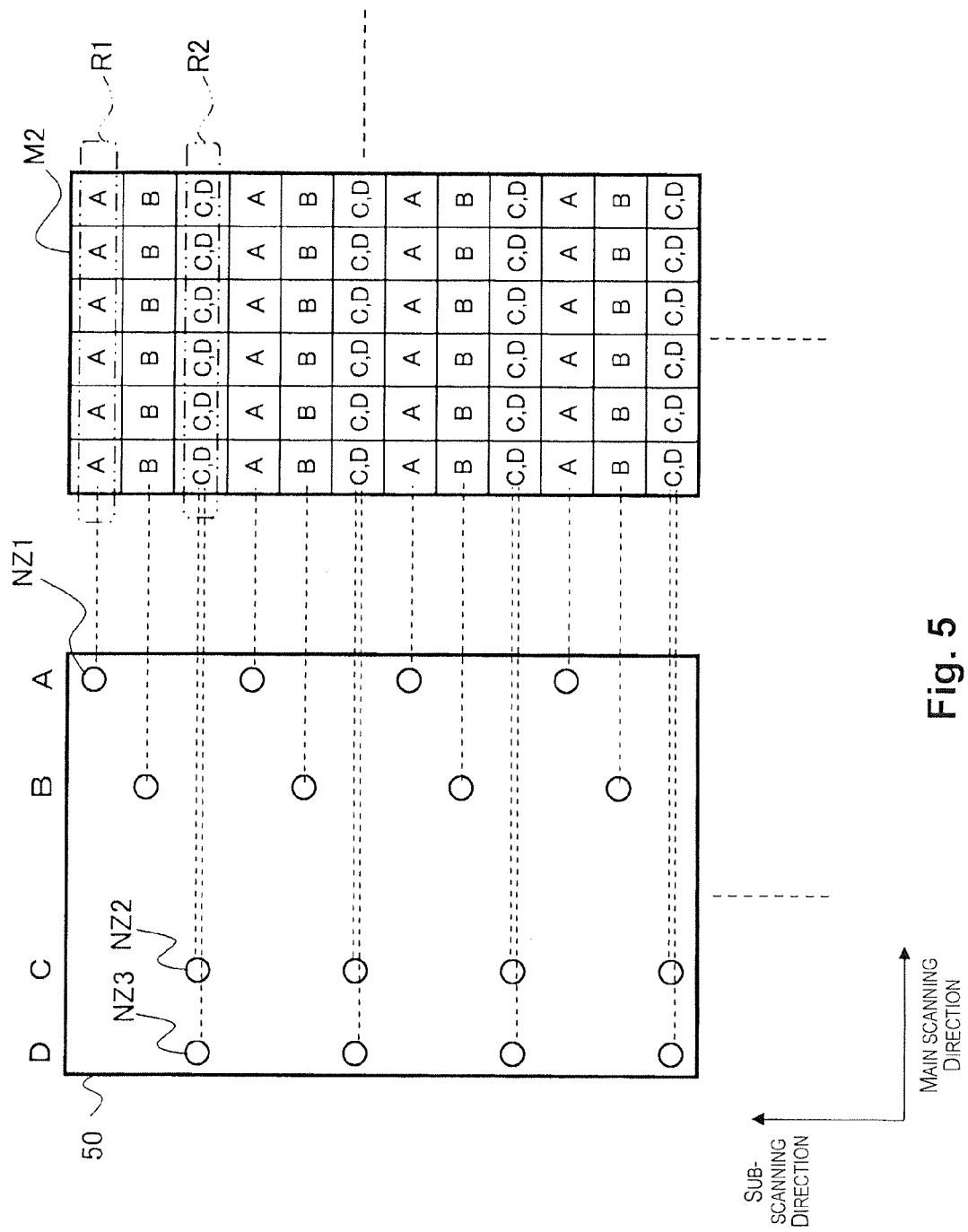
FIG. 5 is a descriptive diagram illustrating an ejection nozzle determination table M2.

FIG. 5 is a descriptive diagram illustrating the ejection nozzle determination table M2. The print head 50 and the ejection nozzle determination table M2 are shown in FIG. 5. The cells of the matrix of the ejection nozzle determination table M2 correspond to pixels of image data. The letters A, B, C, and D disclosed inside the cells show which nozzle rows the nozzles ejecting the ink belong to (see FIG. 2). For example, for dots in dot data corresponding to cells disclosing "A", printing is carried out by ejecting ink from nozzles of row A. Where "C, D" are disclosed in a single cell, printing is carried out by ejecting ink from nozzles belonging to nozzle rows of either row C or row D.

In the printing process of the present example, raster lines in a printed image are printed in the course of a single main scan of the print head 50. For example, the raster line R1 in which cells disclosing "A" line up in the main scanning direction as shown in the ejection nozzle determination table M2 of FIG. 5 forms ink dots on the printing medium P in the course of a single main scan (herein, a main scan of the print head in the printing process is also termed a "pass") of the print head 50 while ejecting ink from nozzles NZ1 belonging to row A shown in the print head 50. Meanwhile, the raster line R2 in which cells disclosing "C, D" in the main scanning direction shown in the ejection nozzle determination table M2 forms dots of ink on the printing medium in the course of a single pass of the print head 50 while ejecting ink from either nozzles NZ2 or nozzles NZ3 belonging to row C or row D shown in the print head 50.

Figures 6, 7:
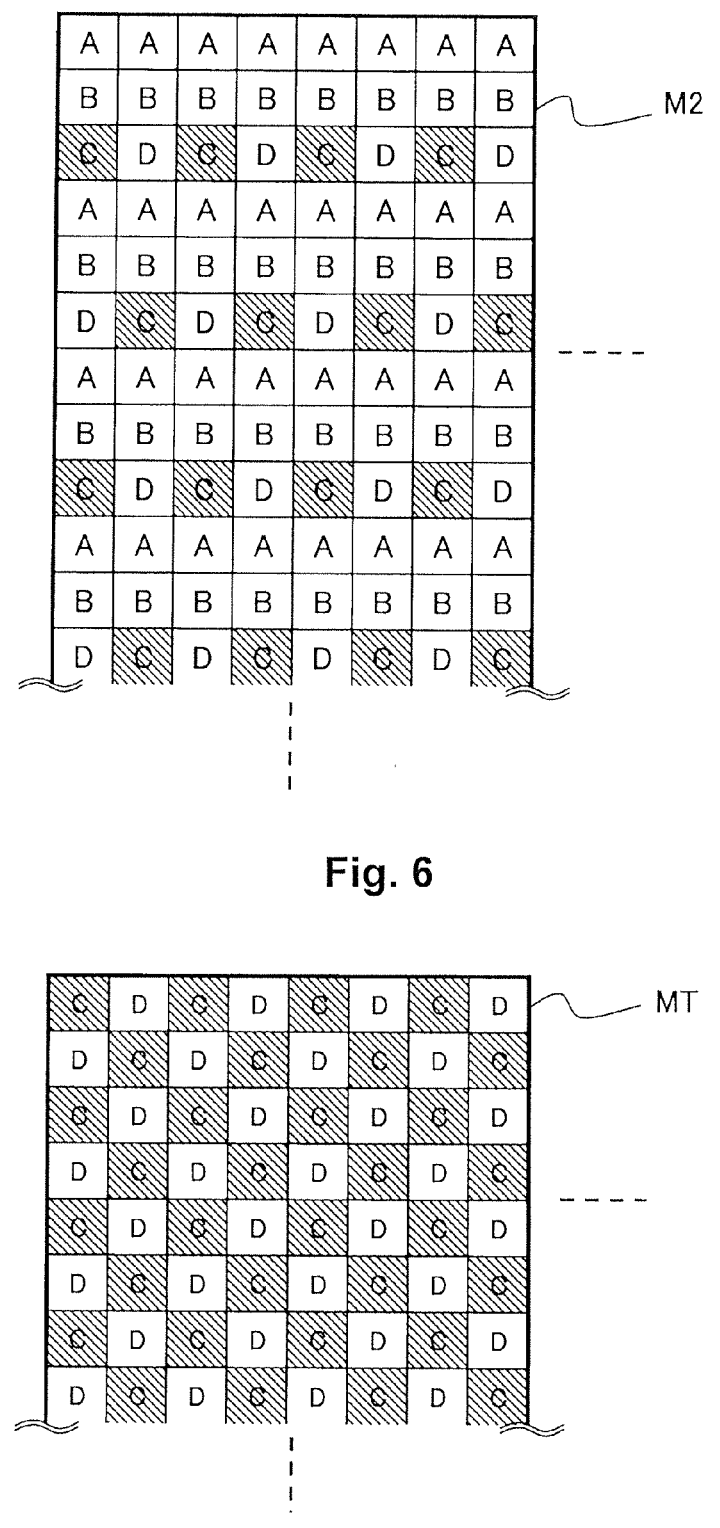

The table shown in FIG. 6 is adopted as the ejection nozzle determination table M2 in the present example. In order for the mode of array of "C" and "D" in the ejection nozzle determination table M2 to be readily visible in FIG. 6, cells pertaining to "C" are shown with hatching. Herein, cells showing that ink is to be ejected from the nozzle row of row C (or row D) to form an ink dot are sometimes simply disclosed as "C" (or "D").

FIG. 7 is a descriptive diagram illustrating characteristics of the ejection nozzle determination table M2 shown in FIG. 6. FIG. 7 shows a matrix MT which is a matrix representation obtained by extraction of "C" and "D" disposed in the ejection nozzle determination table M2 of FIG. 6. In the matrix MT, "C" and "D" are arrayed in a checkerboard pattern. The matrix MT from FIG. 7 has the following four characteristics.

Characteristic (1): Both "C" and "D" are present in the raster lines in the matrix MT.

Characteristic (2): In the matrix MT as a whole, the number of "C" and the number of "D" are the same or approximately the same.

Characteristic (3): "C" and "D" individually have approximately uniform dispersion throughout the matrix MT as a whole.

Characteristic (4): In each raster line of the matrix MT, the number of "C" and the number of "D" are the same or nearly the same.

"Approximately uniform dispersion" as referred to in characteristic (3) means that, for example, the dispersion is one whose spatial frequency characteristics in the pattern for disposing "C" (or "D") in the matrix MT have blue noise characteristics. More specifically, the distribution is one established in consideration of human visual characteristics, whereby in consideration of the human visual characteristic of low sensitivity in the high-frequency area, "C" (or "D") is disposed such that the greatest frequency component is generated in the high-frequency area. The determination as to what sort of characteristics to give the matrix MT is made in the printing device 10 manufacturing stage, and is stored in the ROM 23 of the printing device 10 in the mode of the ejection nozzle determination table M2 shown in FIG. 6.

In the ejection nozzle determination process (FIG. 4: Step S108), the above-described ejection nozzle determination table M2 is applied to the pixels of the dot data, to determine which nozzles should eject ink to form the dots in the dot data. In actual processing, data corresponding to the ejection nozzle determination table M2 is appended to the pixel data in the dot data.

Subsequently, on the basis of the image data from the ejection nozzle determination process, the CPU 21 starts printing (Step S110). Once printing starts, the CPU 21, in a process performed by the printing controller 28, controls the printing mechanism section 30 on the basis of the image data from the ejection nozzle determination process, to scan the print head 50, eject ink from the nozzles NZ, etc., and print a printed image onto the printing medium P. Then, in association with termination of printing of the printed image onto the printing medium P, the CPU 21 terminates the printing process.

As described above, in the printing process, the printing device 10 carries out the ejection nozzle determination process using the ejection nozzle determination table M2 described in FIG. 6. The ejection nozzle determination table M2 described in FIG. 6 is generated on the basis of the matrix MT having the above-described characteristics (1), (2), (3), and (4). The matrix MT in the present example has "Characteristic (1): Both "C" and "D" are present in the raster lines in the matrix MT." Consequently, even in a case where the print head 50 is installed in the printing device 10 in an inclined state due to some outside action during the manufacturing steps or after manufacture, conspicuous localized density of dot disposition (banding) occurring due to inclination of the print head can be minimized. A specific description follows.

Figure 8C:
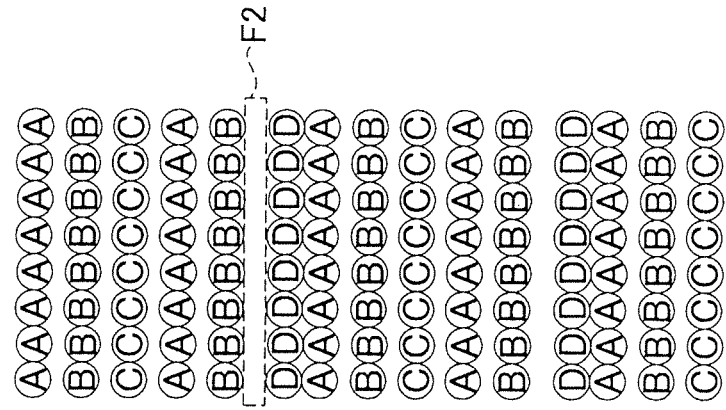
FIG. 8 is a descriptive diagram illustrating effects in the first example.
Figure 8B:
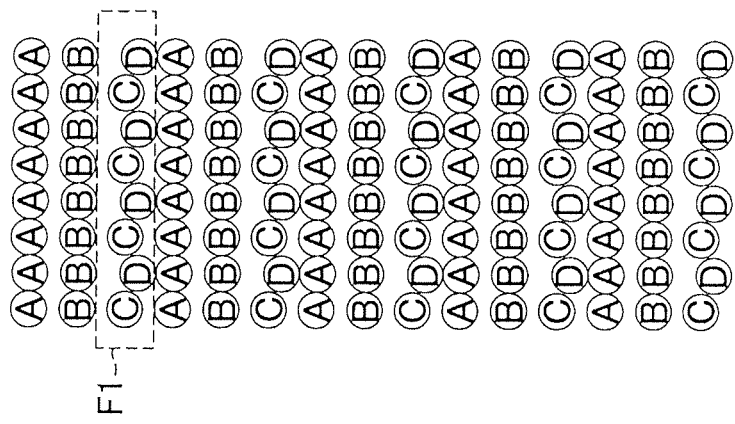
Figure 8A:
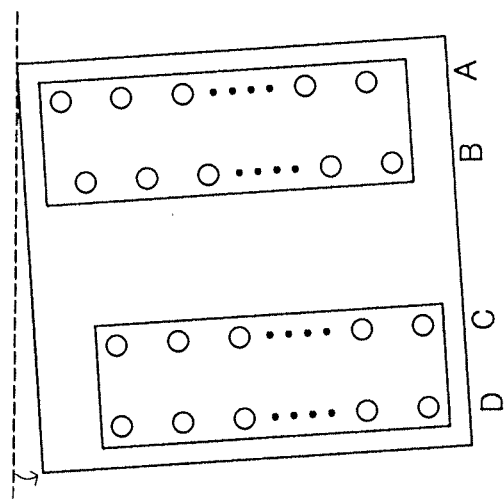

FIG. 8 is a descriptive diagram illustrating effects of the ejection nozzle determination process using the ejection nozzle determination table M2, in a case where printing has been carried out with the print head 50 in an inclined state. FIG. 8A shows the print head 50 in an inclined state. As shown in FIG. 8A, the print head 50 is inclined in a direction of rotation within a plane defined by the main scanning direction and the sub-scanning direction. In a case where printing has been carried out with this print head 50, because according to the ejection nozzle determination process in the present example the raster lines are printed in the course of a single main scan of the print head 50 using the ejection nozzle determination table M2 based on the matrix MT having the aforedescribed characteristic (1) and characteristic (4), dots of ink ejected from nozzles belonging to row C and dots of ink ejected from nozzles belonging to row D are dispersed and intermixed in the main scanning direction on raster lines in which banding occurs.

Furthermore, because the print head 50 is inclined, dots based on row C and dots based on row D are formed with the dot formation positions thereof shifted in the sub-scanning direction. Consequently, as shown by area F1 of FIG. 8B, in areas where banding occurs due to inclination of the print head 50, dots based on row C and dots based on row D are dispersed in the sub-scanning direction. Therefore, conspicuous banding caused by inclination of the print head 50 is minimized.

As a comparative example, in a case where, for example, an ejection nozzle determination process was carried out using an ejection nozzle determination table M2 based on a matrix MT of a mode in which, for example, "C" and "D" are replaced in every raster line, and printing was carried out, banding of considerable width in the sub-scanning direction occurs between raster lines of dots based on nozzles of row B, and raster lines of dots based on nozzles of row D, as shown in FIG. 8C. Further, in the areas of banding, dots are not dispersed in the sub-scanning direction as in FIG. 8B, and therefore banding is conspicuous.

As will be appreciated by comparison with the aforedescribed comparative example, conspicuous banding occurring due to inclination of the print head can be minimized by a matrix MT having the aforedescribed characteristic (1) and characteristic (3). Also, owing to the aforedescribed characteristic (3), dots based on row C and dots based on row D can be dispersed approximately uniformly throughout the entire printed image. Therefore, shifts of dot positions of row C and row D in the sub-scanning direction due to inclination of the print head 50 can be dispersed overall, and visual conspicuousness of this shifting can be minimized further.

Further, in the present example, because the matrix MT has characteristic (2), and additionally, ink is supplied to the nozzles of the ink cartridges 42, 43 by the configuration described in FIG. 3, by carrying out the printing process using the ejection nozzle determination table M2, the ink contained in the ink cartridge 42 and the ink contained in the ink cartridge 43 can be consumed in an approximately uniform manner. In other words, biased depletion (hereinafter also termed "uneven usage") of ink between ink cartridges can be minimized.

The effect of this minimization of uneven usage will be described in specific terms. For example, in cases where a printing process is carried out using the ejection nozzle determination table M2 described in FIG. 6, dots based on row A and dots based on row B are present in approximately equal numbers. Further, owing to the aforedescribed characteristic (2), dots based on row C and dots based on row D are present in approximately equal numbers. Consequently, the total number of dots based on row A and row C, and the total number of dots based on row B and row D, are approximately the same within the ejection nozzle determination table M2. Therefore, consumption of ink from the ink cartridge 42 which supplies ink to the nozzles of row A and row C, and from the ink cartridge 43 which supplies ink to the nozzles of row B and row D, will be approximately uniform throughout the printing process in the aforedescribed example. This effect is particularly effective for image data based on typical natural images, more specifically, image data with a minimum of extreme bias of tone within the area of the printed image.

Also, as discussed above, in the nozzle rows provided to the print head 50, row A and row B have a nozzle unit in common, and row C and row D have a nozzle unit in common. More specifically, the nozzle row of row A and the nozzle row of row B are formed on the same substrate, and are manufactured through the same manufacturing steps. Likewise, the nozzle row of row C and the nozzle row of row D are formed on the same substrate, and are manufactured through the same manufacturing steps. There are cases in which ink ejection characteristics (ink ejection amount, ink ejection speed, and the like) from the nozzles NZ differ among every nozzle unit, due to a cause in the manufacturing steps, but because the nozzle row of row A and the nozzle row of row B have a nozzle unit in common, differences in ink ejection characteristics (particularly ink ejection amount) do not arise within the nozzle unit. Likewise, differences in ink ejection characteristics between the nozzle row of row C and the nozzle row of row D do not arise within the nozzle unit. Consequently, in cases where the printing process is carried out in the present example, the amount of ink consumption consumed in the printing process by the nozzle rows of row A and row C, and the amount of ink consumption consumed in the printing process by the nozzle rows of row B and row D, further approach equality. More specifically, uneven usage of ink can be minimized further.

Reasons such as the following, for example, may be cited as potential causes of differences in ink ejection characteristics from every one of the nozzle units, due to some cause in the aforementioned manufacturing steps. During manufacture of the nozzle units, there is used a substrate material that can be cut into a plurality of substrates to be used as nozzle units. In this substrate material, at every position that will become a nozzle unit, opening of the through-holes that will become the nozzles, attachment of piezo elements in the through-holes, and printing of electrodes is carried out. The nozzle units are then manufactured by cutting the nozzle units from the substrate material having undergone these steps. In some cases, the substrate material may have differences in crystalline structure and in attendant physical properties depending on position therein, and in some cases these differences may be expressed as differences in ink ejection characteristics of every nozzle unit.

As another effect in the present example, on the print head 50 provided to the printing device 10, the nozzles rows of row A, row B, row C, and row D whose nozzle pitch is $\frac{1}{120}$ (inch) are arranged at shifted positions in the sub-scanning direction in a predetermined mode (see FIG. 2). Therefore, through printing by scanning the print head 50 configured in this way, printing can be carried out in a manner substantially similar to a print head configured with a nozzle pitch of $\frac{1}{360}$ (inch). In order to obtain this effect, the present example is configured such that row A, row B, and row C are uniformly shifted in increments of $\frac{1}{360}$ (inch), but there is no limitation thereto, and a configuration in which row A, row B, and row C are shifted by any width in the sub-scanning direction within a permissible range given the configuration of the print head 50 is acceptable. Also, in the present example, the nozzle pitch in the nozzle rows is $\frac{1}{120}$ (inch) and uniform, but there is no limitation thereto, and any nozzle pitch is possible within a permissible range given the configuration of the print head 50.

The elements corresponding with the Claims are as follows: the carriage drive section 32 and the conveying section 34 correspond to the head-moving section disclosed in the Claims, and the CPU 21 corresponds to the control section disclosed in the Claims.

B. Modifications

The aforedescribed example should not be construed as limiting the invention; various modes of working the invention are possible without departing from the spirit of the invention, with modifications such as the following being possible.

(B1) Modification 1

In the printing process of the aforedescribed example, raster lines in the printed image are printed in one pass, but there is no limitation thereto; raster lines may be printed in N passes of the print head 50 (N being an integer equal to 2 or greater). Such printing is termed "overlap printing in N passes," and N is termed as the "overlap number." By carrying out the printing process through overlap printing, shifting of the landing position of ink due to inclination of the print head as discussed previously or to errors in the amount of paper feed, and banding arising from such shifting, does not readily become conspicuous, and image quality can be improved.

Further, while carrying out overlap printing, by scanning the amount of paper feed (more specifically, the scan amount of the print head 50 in the sub-scanning direction relative to the printing medium P), in units of $\frac{1}{720}$ (inch) and by using an interlacing process, printing can be carried out at a resolution of 720 (dpi). Printing techniques using interlacing processes are known in the art, and therefore a description is omitted.

A specific example is described by FIG. 9. FIG. 9 is a descriptive diagram illustrating a first modification. In the present specific example, a printing process is carried out by using the ejection nozzle determination table M2 shown in FIG. 9C. In the ejection nozzle determination table M2 of FIG. 9C, the raster lines of "A," "B," and "C, D" of the ejection nozzle determination table M2 shown in FIG. 5 are respectively arrayed in two-tier increments. There is $\frac{1}{720}$ (inch) between the raster lines.

FIG. 9A and FIG. 9B are descriptive diagrams describing overlap printing carried out in accordance with the ejection nozzle determination table M2 of FIG. 9C, while adjusting the amount of paper feed in units of $\frac{1}{720}$ (inch). For convenience in description, FIG. 9A shows the print head 50 as a nozzle row depicted in cursory form. As discussed previously, because the print head 50 can be viewed as having a configuration substantially similar to a print head with a $\frac{1}{360}$ (inch) configuration, a representation like the print head 50 of FIG. 9A is possible. As for the letters A to D inside the print head 50, the nozzles actually belong to the nozzle rows shown by the letters. The numbers 1 to 5 inside the print head 50 show nozzle numbering in the sub-scanning direction of the nozzle rows. For example, "A-3" shows that the nozzle is the third one in the sub-scanning direction, in the nozzle row of row A.

FIG. 9B is a descriptive diagram of the scanning mode of the print head 50 in the sub-scanning direction; more specifically, of the mode of paper feed of every pass, represented with the print head 50 at the center. In the ejection nozzle determination table M2 of FIG. 9C, dots without hatching are dots formed in a single pass in which the dots are formable, from among the first to sixth passes. As shown in FIGS. 9B and 9C, dots with hatching in FIG. 9C are dots formed by ejection of ink from specific nozzles during passes. By carrying out the printing process in this manner, all of the raster lines can be printed in a plurality of passes (herein also referred to as "full overlap (FOL)"). Through the use of FOL, resolution in the main scanning direction can be improved in the printing process.

Further, it is possible for full overlap printing in this manner to be carried out by only some of the nozzles of the print head 50. In the case of the present modification, overlap printing is carried out using "A-1," "B-1," "C, D-1," "A-5," "B-5," and "C, D-5" of the print head 50. By carrying out overlap printing through partial nozzle coverage in this manner, it is possible to ensure an ample amount of paper feed, and printing speed can be improved when carrying out overlap printing. Also, because printing is carried out using an interlacing process as discussed above, resolution in the main scanning direction can be improved in the printing process (in the present modification, to 720 (dpi)).

(B2) Modification 2

Figure 10:
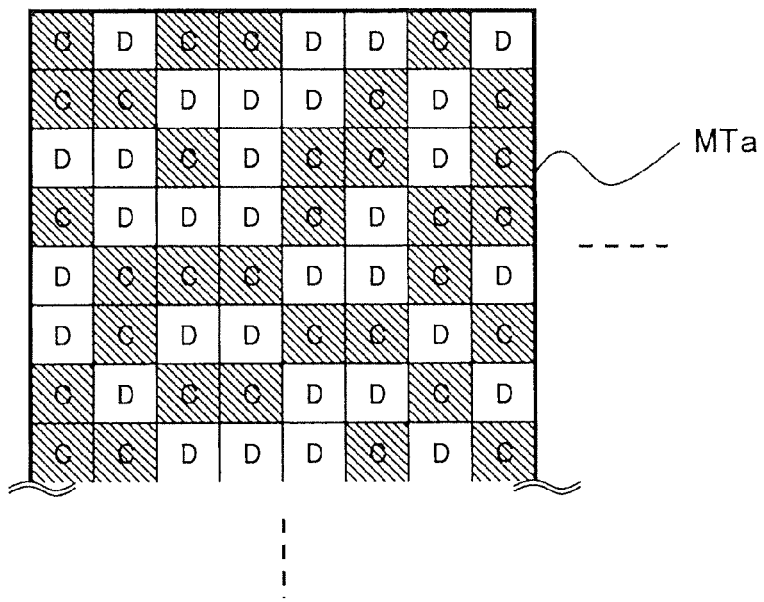
FIG. 10 is a descriptive diagram illustrating a matrix MTa.

In the preceding example, the matrix MT shown in FIG. 7A was used as the matrix MT, but there is no limitation thereto; it is possible to use another matrix MT provided that it fulfills the characteristics (1), (2), (3), and (4) discussed above. For example, the matrix MTa shown in FIG. 10 could be used.

(B3) Modification 3

Figure 11:
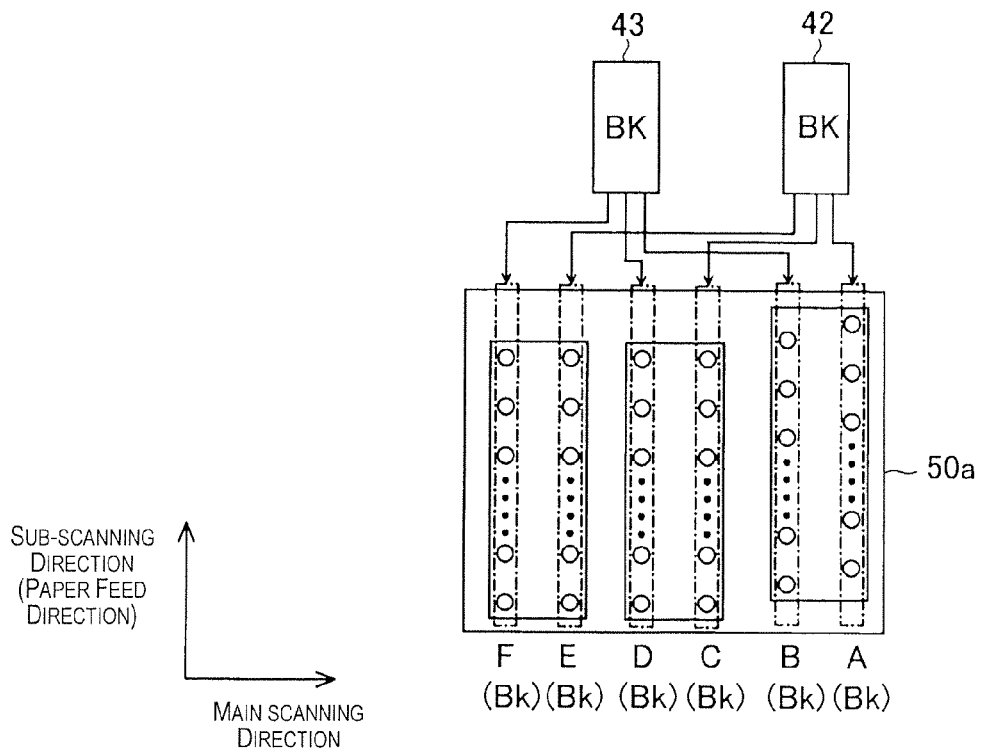
FIG. 11 is a descriptive diagram illustrating a print head 50a in a third modification.

In the preceding example, a print head 50 configured as shown in FIG. 2 was adopted, but there is no limitation thereto; other configurations may be adopted instead. For example, the configuration of a print head 50a or a print head 50b shown in FIGS. 11 and 12 can be adopted as other configurations of the print head. In FIG. 11, row A, row B, and row C are arranged at positions shifted by 1/360 (inch) from one another in the sub-scanning direction, and in row C, row D, row E, and row F, the positions of the nozzles of the nozzle rows in the sub-scanning direction are mutually the same. In the case of the print head 50a, effects comparable to those of the aforedescribed example can be obtained by through adoption of a matrix MT having characteristics in which "C," "D," "E," and "F" have been substituted for "C" and "D" in characteristic (1) to characteristic (4) discussed in the first example.

More specifically, the process is realizable by virtue of having the characteristics of:

Characteristic (1): "C," "D," "E," and "F" are present in the raster lines in the matrix MT.

Characteristic (2): In the matrix MT as a whole, the numbers of "C," "D," "E," and "F" are the same or nearly the same.

Characteristic (3): "C," "D," "E," and "F" respectively have approximately uniform dispersion throughout the matrix MT as a whole.

Characteristic (4): In each raster line of the matrix MT, the numbers of "C," "D," "E," and "F" are the same or nearly the same.

Figure 12:
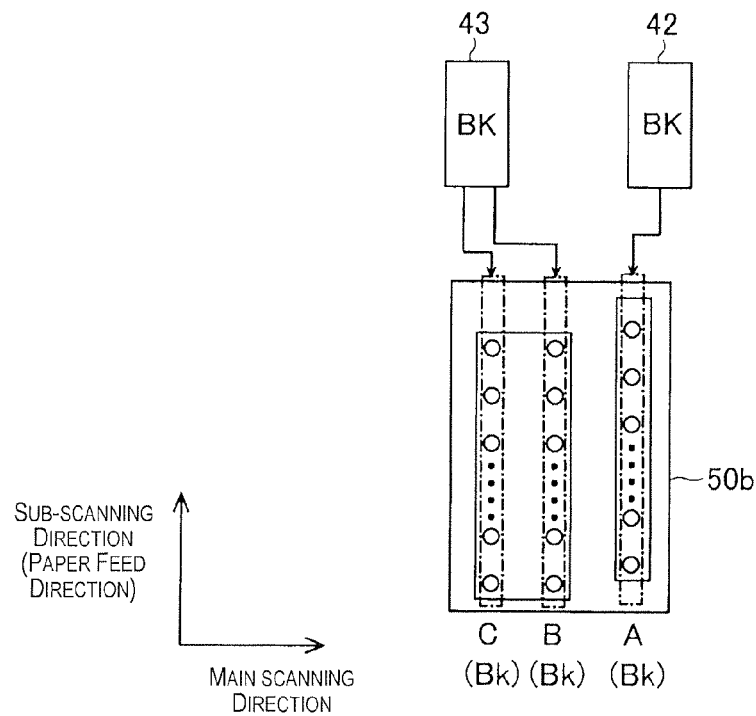
FIG. 12 is a descriptive diagram illustrating a print head 50b in the third modification.

Also, implementation is possible by replacing "C," "D," "E," and "F" of the aforedescribed characteristic (1) to characteristic (4) with any two of "C," "D," "E," and "F." Further, through a mode whereby row A and row B, row C and row D, and row E and row F respectively share common nozzle units, and are supplied with ink as shown in the drawings, uneven usage of ink can be minimized.

Where uneven usage of ink is not taken into consideration, it is possible to adopt the configuration of the print head 50b shown in FIG. 12. Conspicuous banding caused by inclination of the print head 50 can be minimized through adoption of this configuration as well. Also, resolution of printed images can be improved through printing using an interlacing process or FOL process.

(B4) Modification 4

Figure 13:
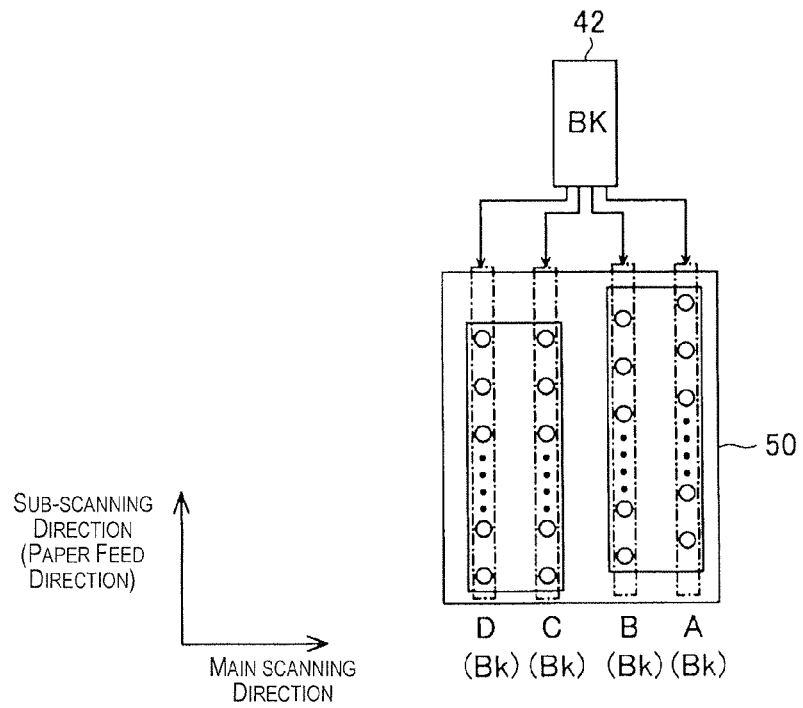
FIG. 13 is a descriptive diagram illustrating a fourth modification provided with one ink cartridge.
Figure 14:
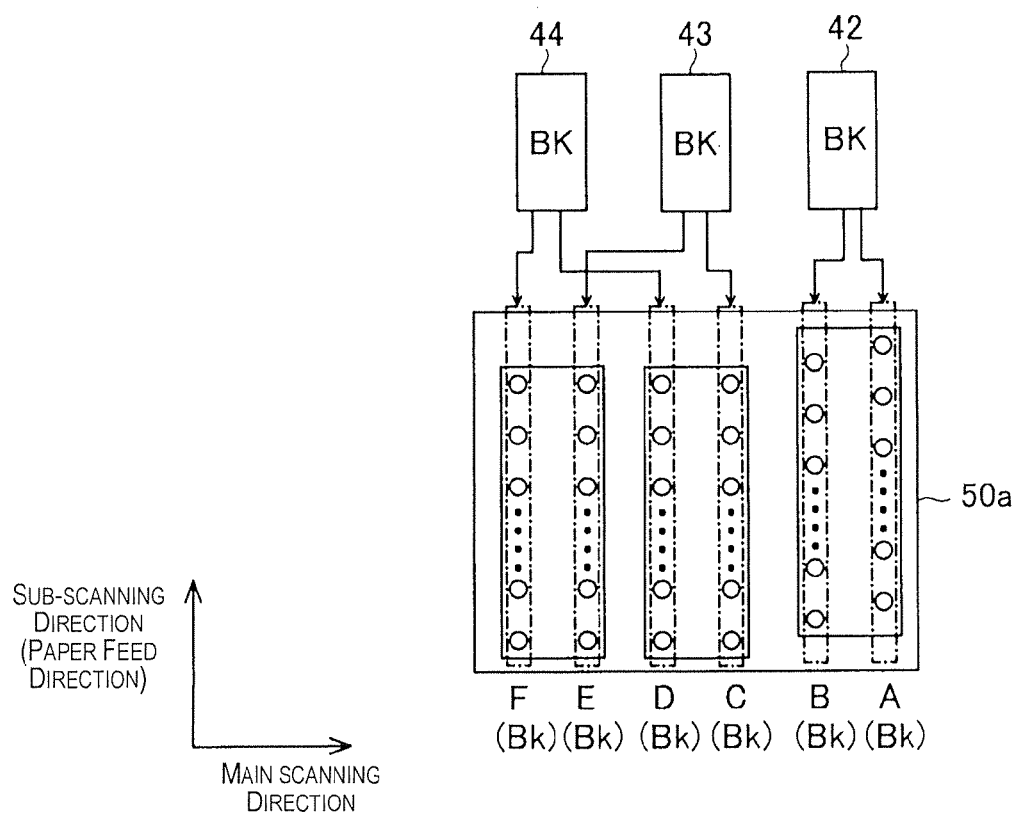
FIG. 14 is a descriptive diagram illustrating a fourth modification provided with three ink cartridges.

In the preceding example, the printing device 10 was provided with two ink cartridges, but there is no limitation thereto; one, three, four, or any other number of ink cartridges may be provided, within the range it is possible for the device to carry. As one example thereof, FIG. 13 shows an arrangement for ink supply, in a case where a single ink cartridge is provided. FIG. 14 shows an arrangement for ink supply, in a case where three ink cartridges are provided. By adopting this arrangement for ink supply as well, it is possible for conspicuous banding to be largely prevented from appearing in printed images.

(B5) Modification 5

In the preceding example, the matrix MT has all of the characteristics (1) to (4), but there is no limitation thereto; it is possible to adopt a matrix MT having characteristic (1) only. With a matrix MT such as this as well, because both "C" and "D" are present in areas where banding occurs in a printed image, conspicuous banding can be largely avoided. Also, by employing a matrix MT having characteristic (1) and characteristic (2), a matrix MT having characteristic (1), characteristic (2), and characteristic (4), or another matrix MT having characteristic (1) as an essential element, combined with any characteristic or characteristics selected from the other characteristic (2) to characteristic (4), conspicuous banding in printed images can be largely avoided.

(B6) Modification 6

Whereas a case has been described in the preceding example where the printing process is carried out by ink dots of a single size in the printing process, the printing device 10 may instead carry out a printing process involving selective printing of ink dots of a plurality of different sizes. For example, it is possible to selectively print ink dots of three sizes: large dots, medium dots, and small dots. The determination of whether to eject a large, medium, or small ink dots can be made on the basis of tone values of pixels of the print data.

(B7) Modification 7

Some of the functions realized through software in the preceding example may instead be realized through hardware, or some of the functions realized through hardware may instead be realized through software. Alternatively, some of the functions realized through software may instead be provided to an external device (for example, a computer) connected to the printing device 10. Whereas in the preceding example a description has been given of the printing device 10 being a multifunction unit provided with a scanner, a copier, and the like, there is no limitation thereto; the printing device 10 may be a dedicated printing device for printing only. In this case, the printing process will be possible through acquisition of image data from a computer externally connected to the printing device 10. Further, whereas by virtue of being a dedicated printing device for monochrome printing the printing device 10 is provided with black ink only, color printing would be possible through separate provision of color inks.

GENERAL INTERPRETATION OF TERMS

In understanding the scope of the invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the invention, it will be apparent to those skilled in the art from this disclosure that various changes and modifications can be made herein without departing from the scope of the invention as defined in the appended claims. Furthermore, the foregoing descriptions of the embodiments according to the invention are provided for illustration only, and not for the purpose of limiting the invention as defined by the appended claims and their equivalents.

What is claimed is:

1. A print head comprising:
   three nozzle rows in which a plurality of nozzles are arrayed in a sub-scanning direction, the nozzle rows being spaced apart in a main scanning direction; wherein
   in two nozzle rows among the three nozzle rows, the positions of the nozzles in the sub-scanning direction are mutually the same;
   in one nozzle row among the three nozzle rows, the positions of the nozzles in the sub-scanning direction lie between nozzles of the two nozzle rows in the sub-scanning direction;
   a head-moving section for causing the print head to move relative to a printing medium in the main scanning direction and in the sub-scanning direction; and
   a controller for controlling the movement of the print head performed by the head-moving section, and ejection of ink from the nozzles,
   the print head being provided with three or more nozzle rows in which a plurality of nozzles for ejecting ink of the same hue are arrayed in the sub-scanning direction, the nozzle rows being spaced apart in the main scanning direction;
   the controller carrying out the control such that at least some raster lines which form a printed image include ink dots formed by ink ejected from two nozzles of mutually the same position in the sub-scanning direction and respectively belonging to the two nozzle rows
   the three nozzle rows can eject ink of the same hue.

2. The printing device according to claim 1, wherein the printed image includes raster lines formed by ink ejected from two nozzles of mutually the same position in the sub-scanning direction and respectively belonging to the two nozzle rows, the raster lines being formed during the movement of the print head one time in the main scanning direction.

3. The printing device according to claim 1, wherein the printed image includes raster lines formed by ink ejected from two nozzles of mutually different positions in the sub-scanning direction and belonging to the two nozzle rows.

4. The printing device according to claim 1, wherein the controller further carries out the control such that, among all of the ink dots forming the printed image, a total dot count of ink dots formed by nozzles of nozzle rows of the two nozzle rows is approximately uniform.

5. The printing device according to claim 1, wherein the controller further carries out the control such that a total dot count of ink dots included in raster lines which form the printed image, which ink dots are formed respectively by two nozzles of mutually the same position in the sub-scanning direction and belonging to the two nozzle rows, is approximately uniform.

6. The printing device according to claim 1, wherein the controller further carries out the control such that, among ink dots forming the printed image, ink dots formed by respective nozzles of the two nozzle rows are dispersed approximately evenly throughout the entirety of the printed image.

7. A print head comprising:
   a first nozzle array including a first nozzle and a second nozzle being next to the first nozzle;
   a second nozzle array including a third nozzle and a fourth nozzle being next to the third nozzle;
   a third nozzle array including a fifth nozzle, the third nozzle being arrayed in a sub-scanning direction and parallel to the first and second nozzle arrays,
   a position of the first nozzle in the sub-scanning direction being same as a position of the third nozzle,
   a position of the second nozzle in the sub-scanning direction being same as a position of the fourth nozzle,
   a position of the fifth nozzle in the sub-scanning direction being between the first and second nozzles,
   the first and third nozzle arrays being configured to eject ink of a hue.

8. The print head according to claim 7, further comprising a fourth nozzle array spaced apart in the main scanning direction, wherein
   the fourth nozzle array includes a sixth nozzle,
   a position of sixth nozzle is different from the first, second, and fifth nozzle in the sub-scanning direction; and
   the fourth nozzle array ejects ink of the same hue as the first, second, and third arrays.

9. The print head according to claim 8, wherein
   the first and third nozzle rows are mutually provided to the same nozzle unit; and
   the second and fourth nozzle arrays are mutually provided to the same nozzle unit.

10. The print head according to claim 8, wherein a nozzle pitch of the first, second, and third nozzle arrays and a nozzle pitch of the fourth nozzle array are the same.

11. A printing device comprising:
    the print head according to claim 7;
    a head-moving section for causing the print head to move relative to a printing medium in the main scanning direction and in the sub-scanning direction; and a controller for controlling the movement of the print head performed by the head-moving section, and ejection of ink from the first to fifth nozzles, wherein the print head is provided with three or more nozzle arrays, the nozzle arrays being spaced apart in the main scanning direction; and the controller carries out the control such that at least some raster lines which form a printed image include ink dots formed by ink ejected from two nozzles of mutually the same position in the sub-scanning direction and respectively belonging to the two nozzle arrays.

12. The printing device according to claim 11, wherein the printed image includes raster lines formed by ink ejected from first and third nozzles of mutually the same position in the sub-scanning direction and respectively belonging to the first and second nozzle arrays, the raster lines being formed during the movement of the print head one time in the main scanning direction.

13. The printing device according to claim 11, wherein the printed image includes raster lines formed by ink ejected from two nozzles of mutually different positions in the sub-scanning direction and belonging to the two nozzle rows.

14. The printing device according to claim 11, wherein the controller further carries out the control such that, among all of the ink dots forming the printed image, a total dot count of ink dots formed by the nozzles of the two nozzle rows is approximately uniform.

15. The printing device according to claim 11, wherein the controller further carries out the control such that a total dot count of ink dots included in raster lines which form the printed image, which ink dots are formed respectively by two nozzles of mutually the same position in the sub-scanning direction and belonging to the two nozzle arrays, is approximately uniform.

16. The printing device according to claim 11, wherein the controller further carries out the control such that, among ink dots forming the printed image, ink dots formed by respective nozzles of the two nozzle arrays are dispersed approximately evenly throughout the entirety of the printed image.

17. A printing method using the print head according to claim 7, wherein the print head is moved relative to a printing medium in the main scanning direction and in the sub-scanning direction; and ink of the same hue is ejected from respective nozzles of three or more nozzle arrays provided to the print head.

\* \* \* \* \*